US012548875B2

(12) United States Patent
Liu

(10) Patent No.: US 12,548,875 B2
(45) Date of Patent: Feb. 10, 2026

(54) ISOLATOR

(71) Applicants: Kabushiki Kaisha Toshiba, Tokyo (JP); Toshiba Electronic Devices & Storage Corporation, Tokyo (JP)

(72) Inventor: Jia Liu, Yokohama Kanagawa (JP)

(73) Assignees: Kabushiki Kaisha Toshiba, Kawasaki (JP); Toshiba Electronic Devices & Storage Corporation, Kawasaki (JP)

(*) Notice: Subject to any disclaimer, the term of this patent is extended or adjusted under 35 U.S.C. 154(b) by 222 days.

(21) Appl. No.: 18/462,127

(22) Filed: Sep. 6, 2023

(65) Prior Publication Data

US 2024/0322412 A1 Sep. 26, 2024

(30) Foreign Application Priority Data

Mar. 23, 2023 (JP) ................................ 2023-046805

(51) Int. Cl.
*H01P 1/36* (2006.01)

(52) U.S. Cl.
CPC .................................... *H01P 1/36* (2013.01)

(58) Field of Classification Search
CPC ................................ H01P 1/36; H01L 23/645
USPC ........................................................ 361/803
See application file for complete search history.

(56) References Cited

U.S. PATENT DOCUMENTS

| | | | | |
|---|---|---|---|---|
| 2023/0092162 | A1* | 3/2023 | Ohguro | H01F 27/324 336/206 |
| 2023/0309228 | A1 | 9/2023 | Imaizumi et al. | |

FOREIGN PATENT DOCUMENTS

| | | | | | |
|---|---|---|---|---|---|
| CN | 216719656 | U * | 6/2022 | | H01F 27/02 |
| JP | H07-220950 | A | 8/1995 | | |
| JP | 2007-149872 | A | 6/2007 | | |
| JP | 2013-021902 | A | 1/2013 | | |
| JP | 2023-141929 | A | 10/2023 | | |
| PL | 175700 | B1 * | 1/1999 | | H01F 27/00 |

* cited by examiner

*Primary Examiner* — Timothy J Thompson
*Assistant Examiner* — Guillermo J Egoavil
(74) *Attorney, Agent, or Firm* — Kim & Stewart LLP

(57) ABSTRACT

According to one embodiment, an isolator includes an isolator module, the isolator module including: a first coil and a second coil, each being helically shaped and having a central axis that extends in a first direction; and a first insulator configured to seal the first coil and the second coil, wherein the first coil and the second coil are separated from each other, and the first coil is positioned inside the second coil when viewed in the first direction.

17 Claims, 10 Drawing Sheets

ISOLATOR

CROSS-REFERENCE TO RELATED APPLICATIONS

This application is based upon and claims the benefit of priority from Japanese Patent Application No. 2023-046805, filed Mar. 23, 2023, the entire contents of which are incorporated herein by reference.

FIELD

Embodiments described herein relate generally to an isolator.

BACKGROUND

An isolator configured to transmit a signal from a transmitter circuit to a receiver circuit, with the transmitter circuit and the receiver circuit mutually insulated, has been known.

DETAILED DESCRIPTION

Figure 1:
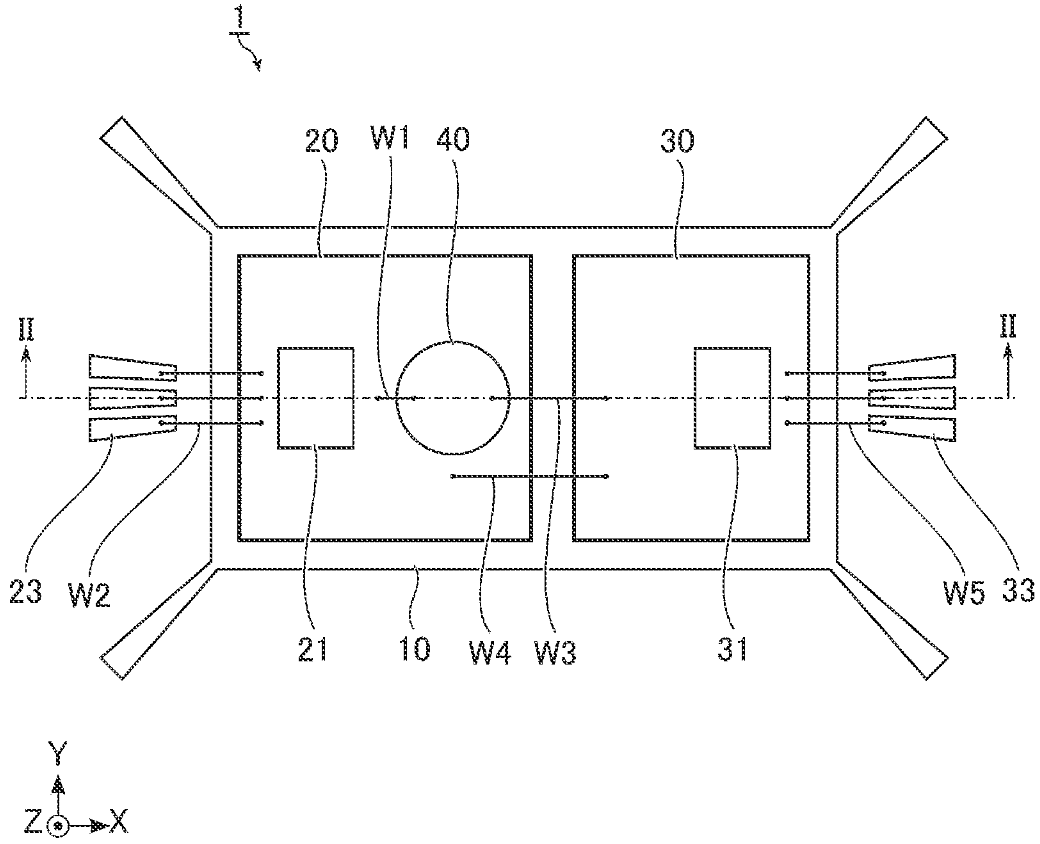
FIG. 1 is a plan view showing an exemplary planar layout of an isolator package according to the present embodiment.

In general, according to one embodiment, an isolator includes an isolator module, the isolator module including: a first coil and a second coil, each being helically shaped and having a central axis that extends in a first direction; and a first insulator configured to seal the first coil and the second coil, wherein the first coil and the second coil are separated from each other, and the first coil is positioned inside the second coil when viewed in the first direction.

The embodiments will be described below with reference to the drawings. Dimensions and proportions of the drawings may not correspond to the actual dimensions and proportions.

In the description below, structural components having the same functions and structures will be given the same reference numerals. If the components having similar structures need to be distinguished from each other, distinctive letters or numerals may be added at the end of the common reference numerals.

1. Embodiment

The isolator according to the present embodiment will be described.

Figure 2:
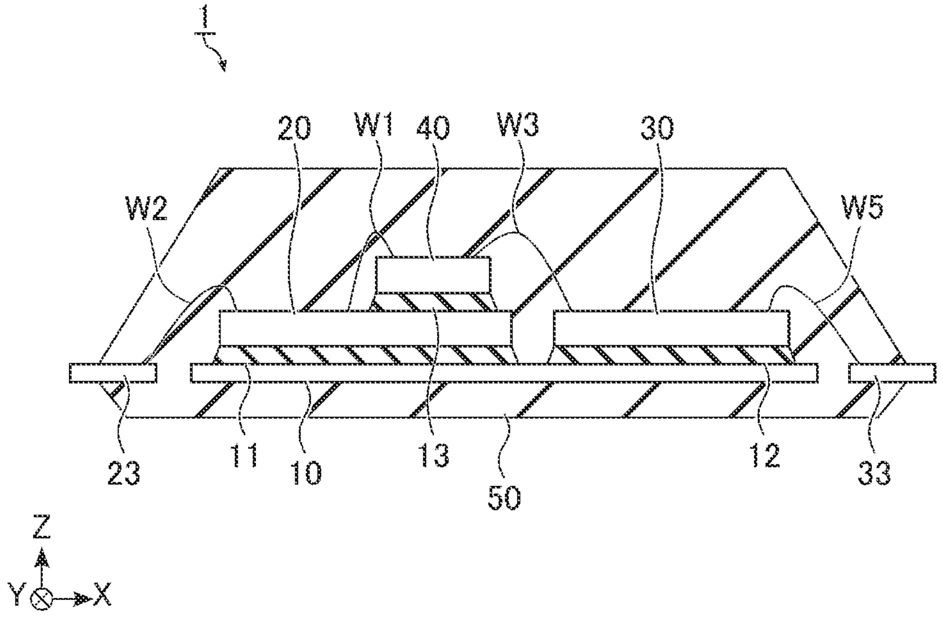
FIG. 2 is a cross-sectional view showing an exemplary cross-sectional structure of the isolator package according to the present embodiment, taken along line II-II in FIG. 1.

FIG. 1 is a plan view showing an exemplary planar layout of an isolator package according to the present embodiment, and FIG. 2 is a cross-sectional view showing an exemplary cross-sectional structure of the isolator package according to the present embodiment, taken along line II-II in FIG. 1. As illustrated in FIGS. 1 and 2, the isolator package 1 is a package that includes a digital isolator. The isolator package 1 includes a frame 10, semiconductor chips 20 and 30, an isolator module 40, and an insulating member 50. The insulating member 50 is not shown in FIG. 1.

The frame 10 may be a metallic plate member, on the top surface of which semiconductor chips 20 and 30 are arranged with insulative adhesion members 11 and 12 respectively interposed. The frame 10 serves as a substrate that supports the semiconductor chips 20 and 30.

In the description below, a plane parallel to the surface of frame 10 will be referred to as an X-Y plane. The directions mutually intersecting on the X-Y plane will be referred to as an X direction and Y direction. The direction intersecting the X-Y plane will be referred to as a Z direction. The Z direction oriented from the frame 10 toward the semiconductor chips 20 and 30 may be referred to as an upward direction.

The isolator module 40 is arranged on the top surface of the semiconductor chip 20 with an insulative adhesion member 13 interposed. When viewed in the Z direction, the isolator module 40 is positioned to overlap the semiconductor chip 20.

A circuit 21 is arranged on the semiconductor chip 20. This circuit 21 includes a signal transmission/reception circuit and a modulation/demodulation circuit. The isolator module 40 is provided above the semiconductor chip 20 by way of flip-chip bonding. The circuit 21 is electrically connected to the isolator module 40 by a bonding wire W1. Furthermore, the circuit 21 is electrically connected to the bottom surface of the isolator module 40, for example via a conductor between the top surface of the semiconductor chip 20 and the bottom surface of the isolator module 40 and the wiring in the semiconductor chip 20, although such a connection is not shown in FIGS. 1 and 2. The conductor may be a bump, or may be a component prepared by soldering. The semiconductor chip 20 and isolator module 40 may be electrically connected to each other using an anisotropic conductive paste (ACP), for instance. The semiconductor chip 20 is electrically connected to a pin 23 by a bonding wire W2.

The semiconductor chip 30 is aligned with the semiconductor chip 20 in the X direction. A circuit 31 is arranged on the semiconductor chip 30, and includes a signal transmission/reception circuit and a modulation/demodulation circuit. The circuit 31 is electrically connected to the isolator module 40 by bonding wires W3 and W4. In particular, the circuit 31 is electrically connected to the top surface of the isolator module 40, for example by the bonding wire W3. The circuit 31 may also be electrically connected to the bottom surface of the isolator module 40 by the bonding wire W4 and also by a conductor between the top surface of the semiconductor chip 20 and the bottom surface of the isolator module 40, and wiring in the semiconductor chips 20 and 30, which are not shown in FIGS. 1 and 2. For this conductor, a component similar to the conductor that electrically connects the circuit 21 of the semiconductor chip 20 to the bottom surface of the isolator module 40 may be adopted. The semiconductor chip 30 is electrically connected to a pin 33 by a bonding wire W5.

The isolator module 40 functions as a digital isolator. The isolator module 40 is provided with a transformer, and using this transformer, the isolator module 40 transmits a signal with the transmitter circuit (primary circuit) insulated from the receiver circuit (secondary circuit). The structure of the isolator module 40 will be described later.

The insulating member 50 may contain an insulative resin. The frame 10, semiconductor chips 20 and 30, isolator module 40, and bonding wire W1, W2, W3, W4, and W5 are sealed by this insulating member 50. The pins 23 and 33 are secured by the insulating member 50, and each pin has a portion exposed to the outside of the insulating member 50.

With the above configuration, the isolator package 1 transmits signals between the pins 23 and 33 via the isolator module 40.

Figure 3:
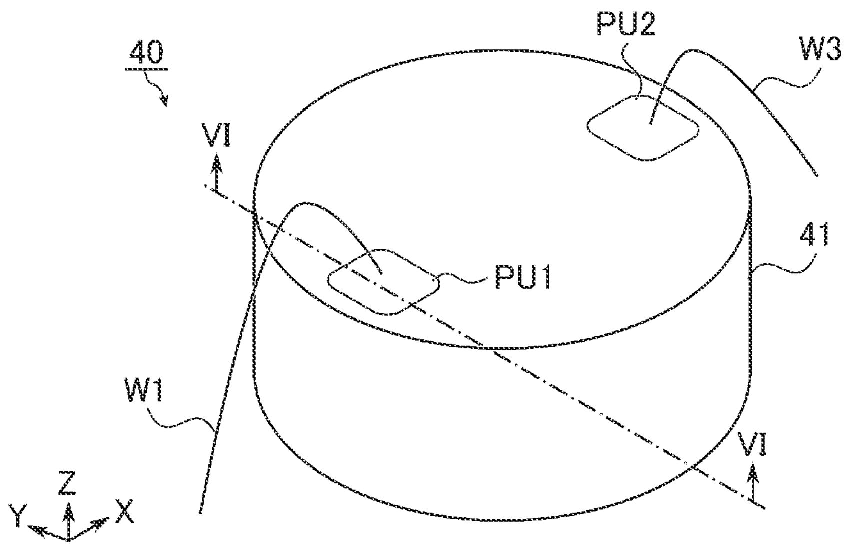
FIG. 3 is a perspective view showing an exemplary structure of an isolator module according to the present embodiment.
Figure 4:
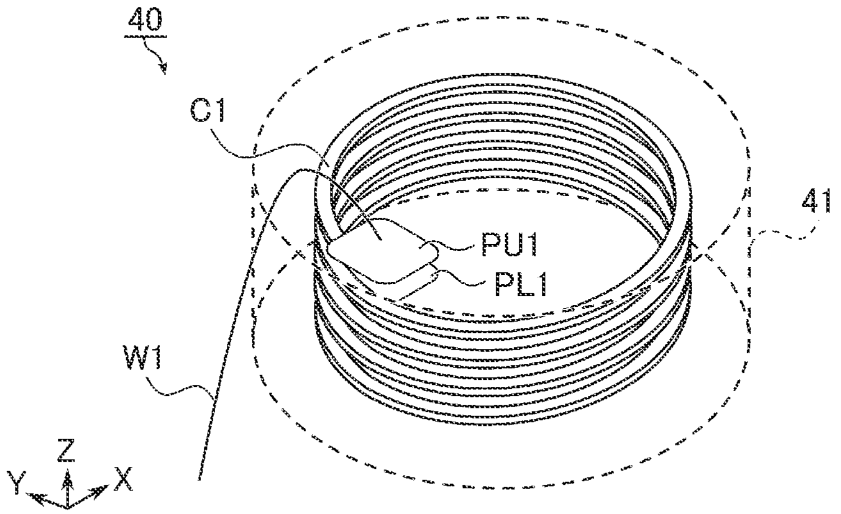
FIG. 4 is a perspective view showing an exemplary structure of a primary circuit in the isolator module according to the present embodiment.
Figure 5:
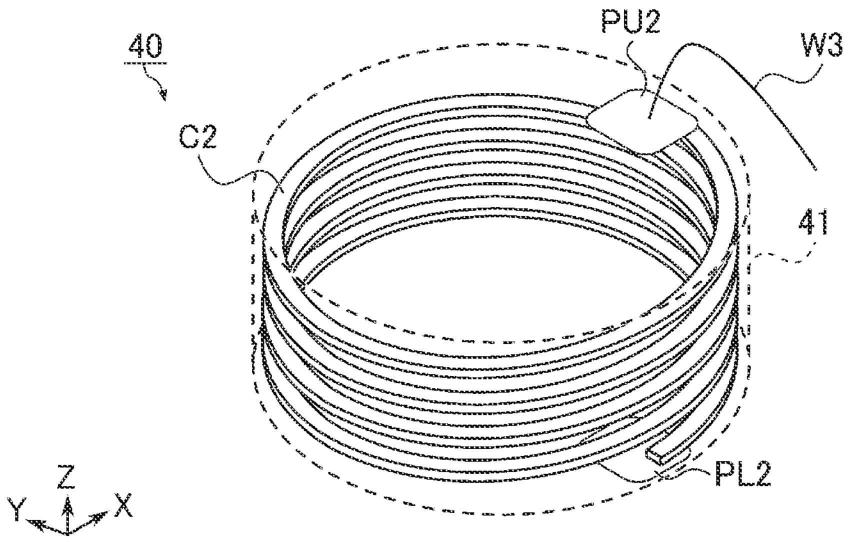
FIG. 5 is a perspective view showing an exemplary structure of a secondary circuit in the isolator module according to the present embodiment.
Figure 6:
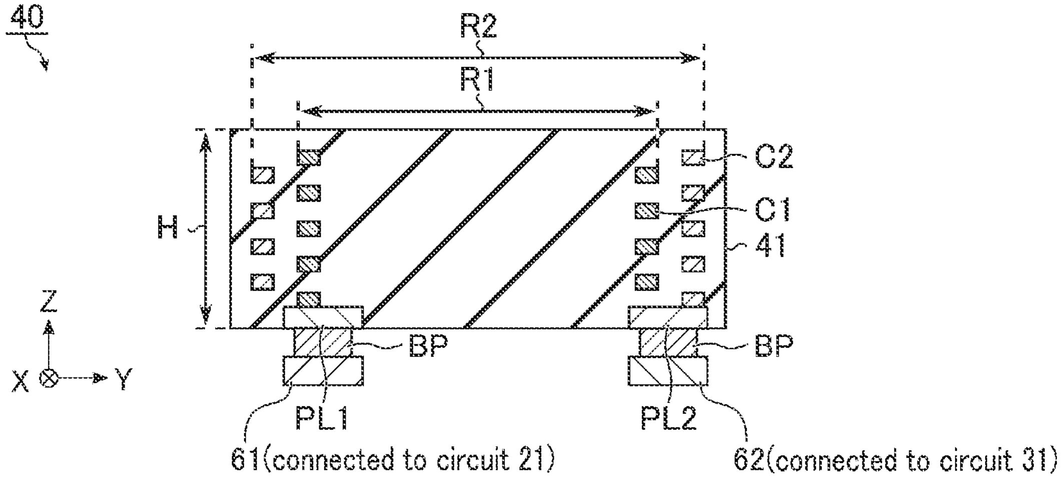
FIG. 6 is a cross-sectional view showing an exemplary cross-sectional structure of the isolator module and wirings according to the present embodiment, taken along line VI-VI in FIG. 3.
Figure 7:
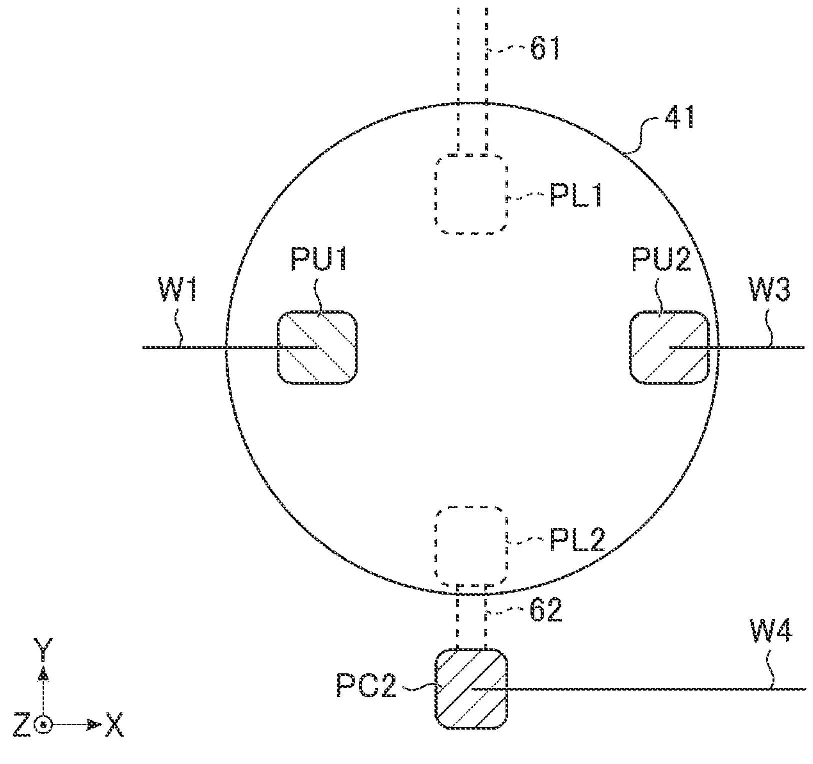
FIG. 7 is a plan view showing an exemplary planar layout of the isolator module and wirings according to the present embodiment.

The configuration of the isolator module according to the present embodiment will be described by referring to FIGS. 3 to 7. FIG. 3 is a perspective view showing an exemplary structure of the isolator module according to the present embodiment. FIG. 4 is a perspective view showing an exemplary structure of the primary circuit in the isolator module according to the present embodiment, while FIG. 5 is a perspective view showing an exemplary structure of the secondary circuit in the isolator module. FIG. 6 is a cross-sectional view showing an exemplary cross-sectional structure of the isolator module and wirings according to the present embodiment, taken along line VI-VI in FIG. 3, and FIG. 7 is a plan view showing an exemplary planar layout of the isolator module and wirings. FIGS. 6 and 7 show wirings provided in the isolator module 40 and semiconductor chip 20. The semiconductor chip 20 and adhesion member 13 are not included in FIGS. 6 and 7.

As illustrated in FIGS. 3 to 7, the isolator module 40 may include an insulator 41. In FIG. 4, a conductive member relating to the primary circuit arranged inside the insulator 41 is shown through the insulator 41 that covers this conductive member, and in FIG. 5, a conductive member relating to the secondary circuit inside the insulator 41 is shown through the insulator 41 that covers this conductive member.

The insulator 41 is an insulative member that covers the primary circuit and secondary circuit. The insulator 41 may be shaped into a cylinder, which is not a limitation, and the insulator 41 can be formed into any shape. The height H of the insulator 41 in the Z direction of FIG. 6 may be approximately 2 millimeters or less.

Conductive pads PU1, PL1, PU2, and PL2, and coils C1 and C2 are arranged inside the insulator 41. The insulator 41 is formed to cover the coils C1 and C2. The pads PU1 and PU2 are at least partially exposed on the top surface of the insulator 41. The pads PL1 and PL2 are at least partially exposed on the bottom surface of the insulator 41.

The coil C1 is formed of a conductor, and may contain copper, for example. The coil C1 is helically formed, or in other words, it has a shape of a coil spring. In particular, the coil C1 includes a coil spring-like wire that is wound around the peripheral surface of a cylinder, which has a top surface and bottom surface in the X-Y planes. The coil C1 therefore has a central axis extending in the Z direction. The central axis of a coil is an axis that extends in a direction of the coil becoming longer as the number of turns of the coil increases. With the above configuration, the coil C1 is circular when viewed from above. The coil C1 is formed in such a manner as to have an inner diameter and outer diameter that are both approximately uniform throughout its entire length along the Z direction. As illustrated in FIG. 6, the coil C1 has an outer diameter R1. With the above configuration, the coil C1 exhibits a specific inductance.

The coil C1 has an upper end and a lower end. The upper end of the coil C1 is electrically connected to the bottom surface of the pad PU1. The lower end of the coil C1 is electrically connected to the top surface of the pad PL1.

With the above coil C1 and pads PL1 and PU1, a current path is formed between the pads PL1 and PU1. The coil C1 is also referred to as a primary coil.

The coil C2 is formed of a conductor, and may contain copper, for example. As with the coil C1, the coil C2 is helically formed, or in other words, it has a shape of a coil spring. In particular, the coil C2 has a shape of a cylindrically wound coil spring, as with the coil C1. The coil C2 therefore has a central axis extending in the Z direction. With the above configuration, the coil C2 is circular when viewed from above. The coil C2 is formed to have an inner diameter and outer diameter that are both approximately uniform throughout their lengths along the Z direction. As illustrated in FIG. 6, the coil C2 has an outer diameter R2, which is larger than the outer diameter R1. The outer diameter R2 may be approximately 5 millimeters or less. The inner diameter of the coil C2 is also larger than the outer diameter R1 so that the coil C2 can be arranged outside the coil C1 and with a distance apart from the coil C1. The coils C1 and C2 are electrically insulated from each other by a portion of the insulator 41. With the above configuration, the coil C2 exhibits a specific inductance. The heights of the coil C2 and the coil C1 are both within a specific range of height.

The coil C2 has an upper end and a lower end. The upper end of the coil C2 is electrically connected to the bottom surface of the pad PU2. The lower end of the coil C2 is electrically connected to the top surface of the pad PL2.

With the above coil C2 and pads PL2 and PU2, a current path is formed between the pads PL2 and PU2. The coil C2 is also referred to as a secondary coil.

In the above configuration, the primary coil and secondary coil are arranged close to each other in the insulator 41. The primary coil and secondary coil thereby function as a transformer.

The bottom surface of the pad PL1 is electrically connected to a wire 61 provided in the semiconductor chip 20 with a conductor BP interposed. The wire 61 is electrically connected to the circuit 21 of the semiconductor chip 20. In the structure of FIG. 6, another pad that is not shown may be provided between the wire 61 and the conductor BP.

The bottom surface of the pad PL2 is electrically connected to a wire 62 provided in the semiconductor chip 20 with another conductor BP interposed. As illustrated in FIG. 7, the wire 62 is electrically connected, for example to a pad PC2 arranged on the semiconductor chip 20. The pad PC2 is electrically connected to the circuit 31 of the semiconductor chip 30 by a bonding wire W4. In the structure of FIG. 6, another pad that is not shown may be provided between the wire 62 and conductor BP.

As mentioned earlier, the conductors BP are formed of bumps or by soldering so as to electrically connect each of the wires 61 and 62 of the semiconductor chip 20 to the isolator module 40.

The pads PU1, PL1, PU2, and PL2 are arranged in this order, for example in the winding direction around the helical axis that extends along the Z direction. Among the pads PU1, PL1, PU2, and PL2, the pads PU1 and PL1 are positioned adjacent to each other in the winding direction, and the pads PU2 and PL2 are positioned adjacent to each other in the winding direction.

The positioning of the pads PU1, PL1, PU2, and PL2 according to the present embodiment is not limited to the above. The positioning is sufficient as long as the pads PU1 and PL1 are adjacent to each other and the pads PU2 and PL2 are adjacent to each other. The positioning of the pads PU1, PL1, PU2, and PL2 may be determined in accordance with the number of turns of the coils C1 and C2 and the circular positioning of the coils around the helical axis that extends along the Z direction.

In the above description, the coil C2 is provided outside the coil C1, which is not a limitation. The coil C1 may be provided outside the coil C2. In this case, the outer diameter R1 of the coil C1 is larger than the outer diameter R2, and is approximately 5 millimeters or less. The inner diameter of the coil C1 is also larger than the outer diameter R2.

In addition, in the above description, the coils C1 and C2 are circularly shaped when viewed from above. This is not a limitation, however, and the coils C1 and C2 may be elliptical when viewed from above. In this case, the outer one of the coils C1 and C2 has an outer diameter of approximately 5 millimeters or less in the longitudinal direction. Alternatively, the coils C1 and C2 may be polygonal when viewed from above.

According to the present embodiment, each of the coils C1 and C2 in the isolator module 40 has a helical shape. The size and area of the isolator module therefore can be reduced in comparison with an isolator module prepared by adhering a wiring board including the primary coil to a wiring board including the secondary coil. If an isolator module is prepared by adhering a wiring board including the primary coil to a wiring board including the secondary coil, each coil will be spirally arranged on a plane. Such an arrangement may increase the sizes and areas of the coils and isolator module if the coils are designed to have certain inductances. On the other hand, with the above configuration of the coils C1 and C2 according to the present embodiment, their planar sizes and areas can be reduced. Thus, the size and area of the isolator module 40 can be prevented from increasing.

According to the present embodiment, the coil C1 is provided inside the coil C2 in the insulator 41. This can suppress the displacement of the coils C1 and C2 and also suppress the deterioration of characteristics caused by the displacement. More specifically, in an isolator module that is prepared by adhering a wiring board including the primary coil to a wiring board including the secondary coil, the primary coil and secondary coil may be displaced at the production step of adhering the two wiring boards. This displacement may lower the characteristics of the isolator module. In order to reduce the displacement of the primary coil and secondary coil, the production process may need to become complicated. According to the present embodiment, the primary coil and secondary coil are arranged in the same insulator 41, which means that the displacement can be readily reduced in comparison with an isolator module prepared by adhering a wiring board including the primary coil to a wiring board including the secondary coil. Thus, complication of the processing process for an isolator module and deterioration of the characteristics of the module can be avoided.

According to the present embodiment, two bonding wires are required to be directly coupled to the isolator module 40. This increases the degree of freedom in the arrangement of the isolator module 40. In an isolator module that is formed by adhering a wiring board that includes the primary coil and a wiring board that includes the secondary coil together, two ends of the primary coil need to be respectively coupled to the primary circuit, and two ends of the secondary coil need to be respectively coupled to the secondary circuit. This means that four bonding wires are required to be directly coupled to the isolator module. According to the present embodiment, in comparison with the structure of an isolator module in which the wiring board including the primary coil and the wiring board including the secondary coil are adhered together, the number of bonding wires required to be directly coupled to the isolator module 40 can be reduced. As a result, the degree of freedom in the arrangement of the isolator module 40 can be enhanced.

In addition, according to the present embodiment, yields can be improved. In particular, with the degree of freedom improved in the arrangement of the isolator module 40, the production step of forming the bonding wires for the arrangement of the isolator module 40 will become less complicated. This can suppress the production of defective products, and thereby enhance yields. Furthermore, according to the present embodiment, the isolator module 40 can be electrically connected to the semiconductor chips 20 and 30 with the bonding wires W1, W3, and W4. Such a structure can reduce the number of bonding wires required to couple the isolator module and semiconductor chips, in comparison with an isolator module formed by adhering the wiring board including the primary coil and the wiring board including the secondary coil together. Such a structure also contributes to improved yields.

According to the present embodiment, the isolator module 40 is electrically connected to the semiconductor chip 20 through flip-chip bonding. The isolator module 40 is therefore deposited at a position that overlaps the semiconductor chip 20 in the Z direction. With such a structure, the size and area of the isolator package 1 will not be increased.

In addition, with the above coils C1 and C2, an increase in the size and area of the isolator module 40 can be suppressed even if the coupling coefficient of the transformer is increased. In other words, the coupling coefficient of the transformer can be increased by increasing the number of turns for each of the coils C1 and C2 while maintaining the outer diameters of the coils.

Still further, with the above coils C1 and C2, the positioning of the pads PU1, PL1, PU2, and PL2 can be readily adjusted. That is, by adjusting the circular positioning of the coils and the number of turns of the coils, the positions of the pads PU1, PL1, PU2, and PL2 can be suitably determined. With such a structure, the degree of freedom in the arrangement of the isolator module 40 can also be enhanced.

2. Modification Examples

Next, isolators according to different modification examples will be described. In the modifications described below, descriptions of parts of the configurations identical to those of the embodiment will be omitted, and parts of the configurations that differ from the embodiment will be mainly discussed.

2.1 First Modification Example

An isolator according to the first modification example will be described. The first modification example differs from the embodiment in that the pad PU1 and pad PL1 of the isolator module 40 face each other, and the pad PU2 and pad PL2 face each other, when viewed from above. Parts of the configuration that differ from the embodiment will be mainly discussed, and the descriptions of parts of the configuration identical to those of the embodiment will be omitted.

Figure 8:
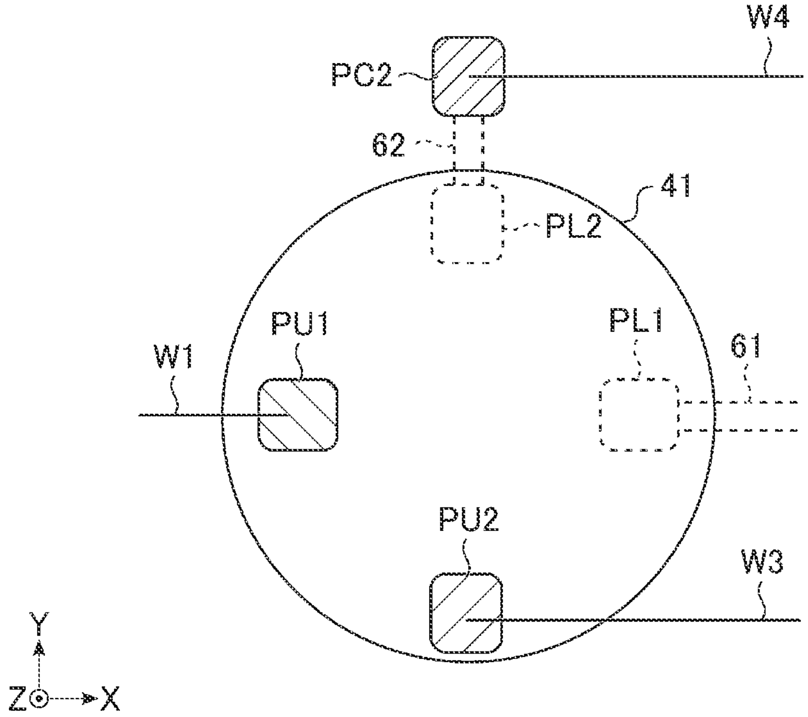
FIG. 8 is a plan view showing an exemplary planar layout of an isolator module and wirings according to the first modification example.

The configuration of the isolator module 40 according to the first modification example will be described with reference to FIG. 8. This drawing is a plan view showing an exemplary planar layout of the isolator module and wirings according to the present embodiment. FIG. 8 shows a region corresponding to that of FIG. 7.

The pads PU1, PL2, PL1, and PU2 are arranged in this order in the winding direction of the coils around the helical axis that extends along the Z direction. With this arrangement, the pad PU1 is positioned between the pads PU2 and PL2 in the winding direction, and the pad PL1 is positioned between the pads PL2 and PU2 in the winding direction among the pads PU1, PL2, PL1, and PU2. This means that the pads PU1 and PL1 face each other, and the pads PU2 and PL2 face each other.

According to the embodiment, the arrangement of the pads PU1, PL1, PU2, and PL2 is not limited to the above. The arrangement is sufficient as long as the pads PU1 and PL1 face each other and the pads PU2 and PL2 face each other.

The structures of the coils C1 and C2 are identical to those of the embodiment, except for the number of turns of the coils and the circular positioning of the coils around the helical axis that extends along the Z direction.

The first modification example produces effects similar to those of the embodiment.

2.2 Second Modification Example

Next, the isolator according to the second modification example will be described. The second modification example differs from the embodiment and the first modification example in that the isolator module 40 is deposited at a position that does not overlap the semiconductor chips 20 and 30, when viewed from above. The parts of the configuration that differ from the embodiment and the first modification example will be mainly discussed below.

Figure 9:
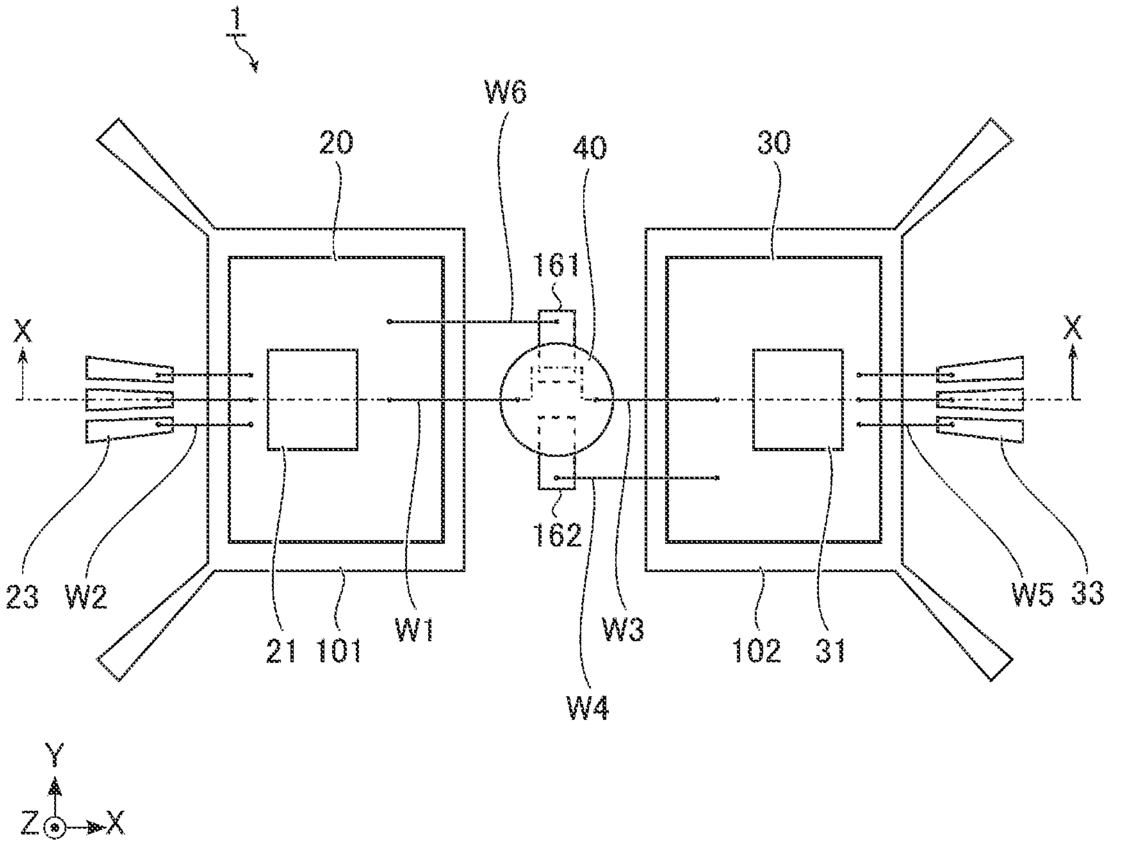
FIG. 9 is a plan view showing an exemplary planar layout of an isolator package according to the second modification example.
Figure 10:
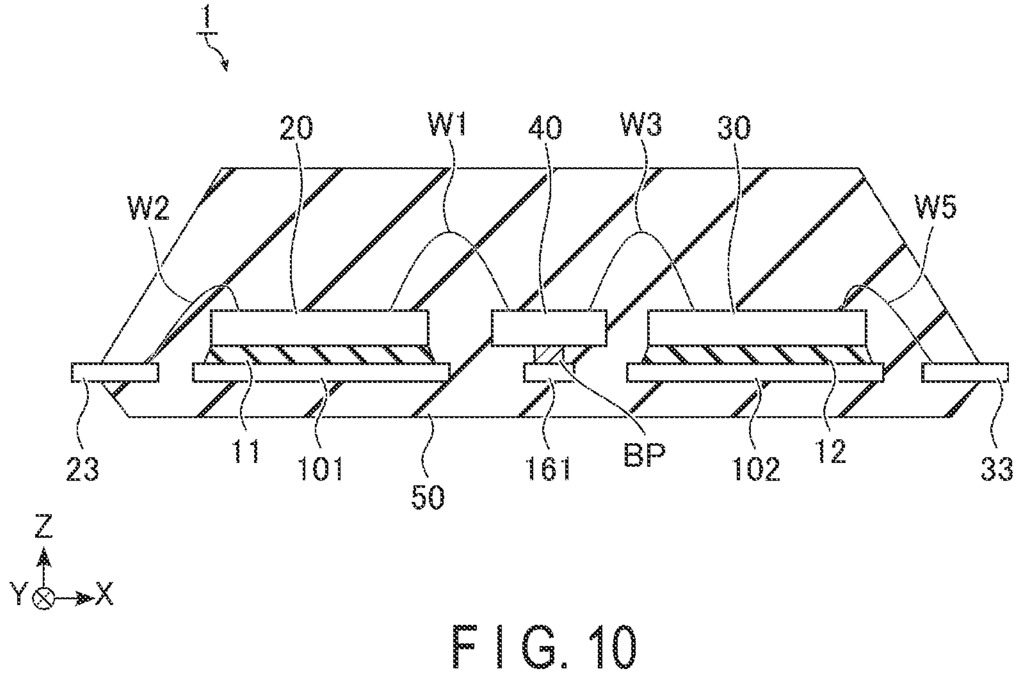
FIG. 10 is a cross-sectional view showing an exemplary cross-sectional structure of the isolator package according to the second modification example, taken along line X-X in FIG. 9.

As illustrated in FIGS. 9 and 10, an isolator package 1 includes frames 101, 102, 161, and 162 in place of the frame 10 of the embodiment. FIG. 9 is a plan view showing an exemplary planar layout of the isolator according to the second modification example, and FIG. 10 is a cross-sectional view showing an exemplary cross-sectional structure of the isolator according to the second modification example, taken along line X-X in FIG. 9.

The isolator package 1 includes the frames 101, 102, 161, and 162, in addition to the semiconductor chips 20 and 30, isolator module 40, and insulating member 50.

The frames 101, 102, 161, and 162 may be metal plate members.

The semiconductor chips 20 and 30 are arranged on the surface of the frames 101 and 102 with insulative adhesion members 11 and 12 respectively interposed. The frames 101 and 102 each serve as a substrate that supports the semiconductor chips 20 and 30, respectively.

The isolator module 40 is arranged above the frames 161 and 162. The isolator module 40 is electrically connected to the frames 161 and 162 with a conductor BP interposed. FIG. 10 shows the frame 161 and the conductor BP coupled to the frame 161, while the frame 162 and a conductor BP coupled to the frame 162 are omitted. The conductors BP are formed of bumps or by soldering so as to electrically connect each of the frames 161 and 162 to the isolator module 40. The isolator module 40 is electrically connected to the frames 161 and 162 through flip-chip bonding, as in the isolator module 40 connected to the semiconductor chip 20 according to the embodiment. The frame 161 is electrically connected to the circuit 21 of the semiconductor chip 20 by a bonding wire W6 that is sealed by the insulating member 50. The frame 162 is electrically connected to the circuit 21 of the semiconductor chip 20 by the bonding wire W4. The frames 161 and 162 each serve as a substrate that supports the isolator module 40.

The above configuration produces effects similar to the ones in the embodiment and first modification example.

2.3 Third Modification Example

The isolator according to the third modification example will be described. The third modification example differs from the embodiment and first and second modification examples in that the semiconductor chips 20 and 30 and isolator module 40 are supported by the semiconductor substrate. The parts of the configuration that differ from the embodiment and the first and second modification examples will be mainly discussed below.

Figure 11:
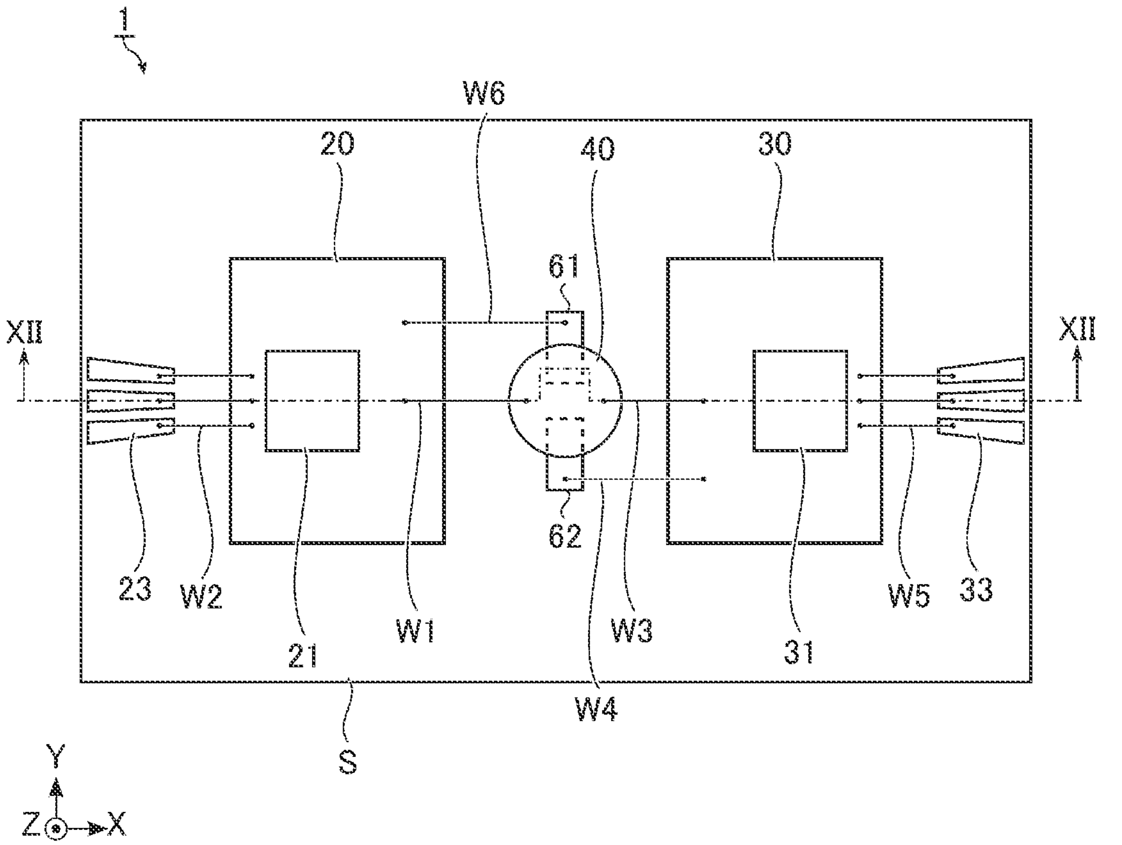
FIG. 11 is a plan view showing an exemplary planar layout of an isolator package according to the third modification example.
Figure 12:
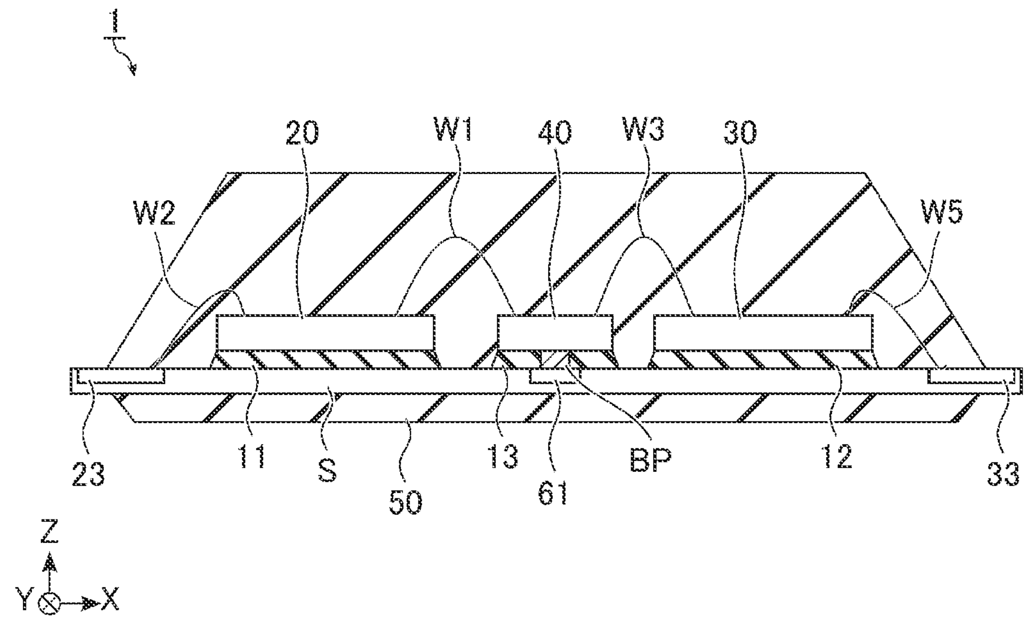
FIG. 12 is a cross-sectional view showing an exemplary cross-sectional structure of the isolator package according to the third modification example, taken along line XII-XII in FIG. 11.

The configuration of the isolator package 1 will be described with reference to FIGS. 11 and 12. FIG. 11 is a plan view showing an exemplary planar layout of the isolator package according to the third modification example. FIG. 12 is a cross-sectional view showing an exemplary cross-sectional structure of the isolator package according to the third modification example, taken along line XII-XII in FIG. 11.

The isolator package 1 includes a semiconductor substrate S, in addition to the semiconductor chips 20 and 30, isolator module 40, and insulating member 50.

The semiconductor chips 20 and 30, and isolator module 40 are arranged on the surface of the semiconductor substrate S, with insulative adhesion members 11, 12 and 13 respectively interposed. The semiconductor substrate S serves as a substrate that supports the semiconductor chips 20 and 30, and isolator module 40.

Pins 23 and 33 and wires 61 and 62 are provided in the semiconductor substrate S. In this semiconductor substrate S, each of the pins 23 and 33 and wires 61 and 62 is exposed at least partially on the top surface of the semiconductor substrate S. As with the frame 161 of the second modification example, the wire 61 is electrically connected to the circuit 21 of the semiconductor chip 20 by the bonding wire W6. As with the wire 62 in the semiconductor chip 20 according to the embodiment, the wire 62 of the present modification example is electrically connected to the circuit 31 of the semiconductor chip 30 by the bonding wire W4. As in the embodiment, the isolator module 40 is arranged on the top surfaces of the wires 61 and 62 with conductors BP interposed. The wires 61 and 62 are thereby electrically connected to the isolator module 40.

The above configuration produces effects similar to the ones in the embodiment and first and second modification examples.

2.4 Fourth Modification Example

The isolator according to the fourth modification example will be described. The fourth modification example differs from the third modification example in that the pins 23 and 33, semiconductor chips 20 and 30, and isolator module 40 are coupled by molded interconnects in place of the bonding wires W1 to W6. The parts of the configuration that differ from the third modification example will be mainly discussed below.

Figure 13:
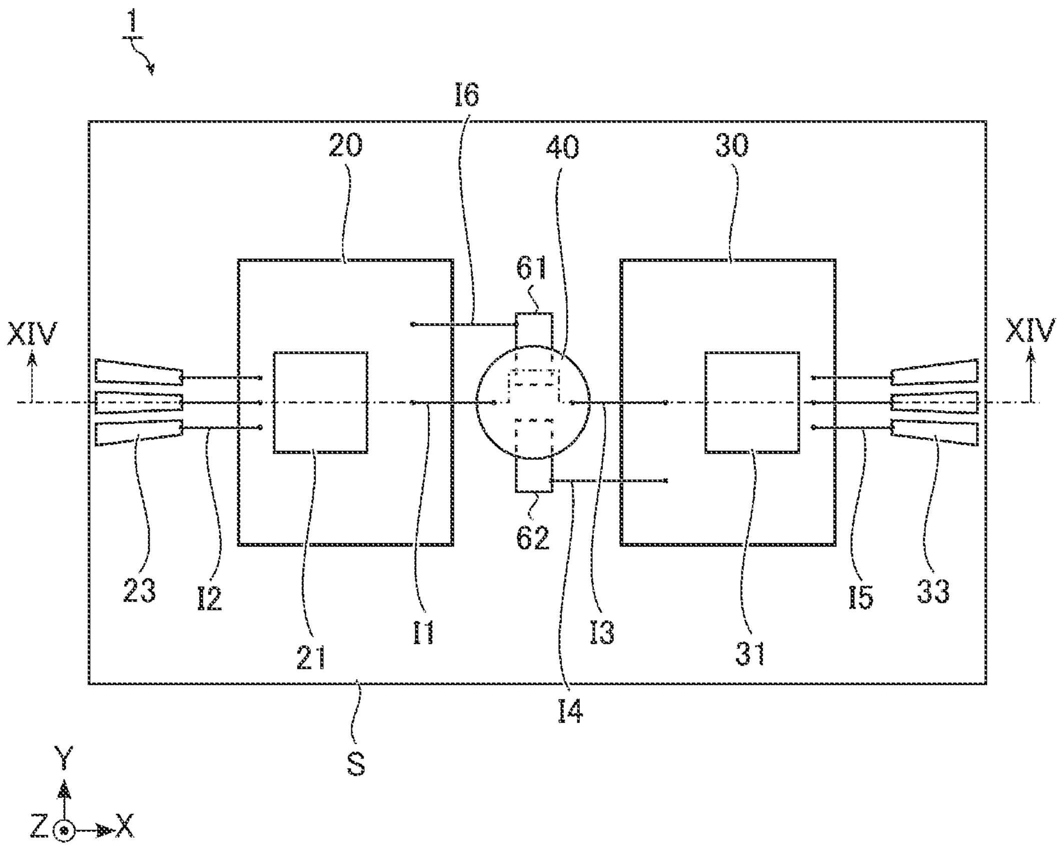
FIG. 13 is a plan view showing an exemplary planar layout of an isolator package according to the fourth modification example.
Figure 14:
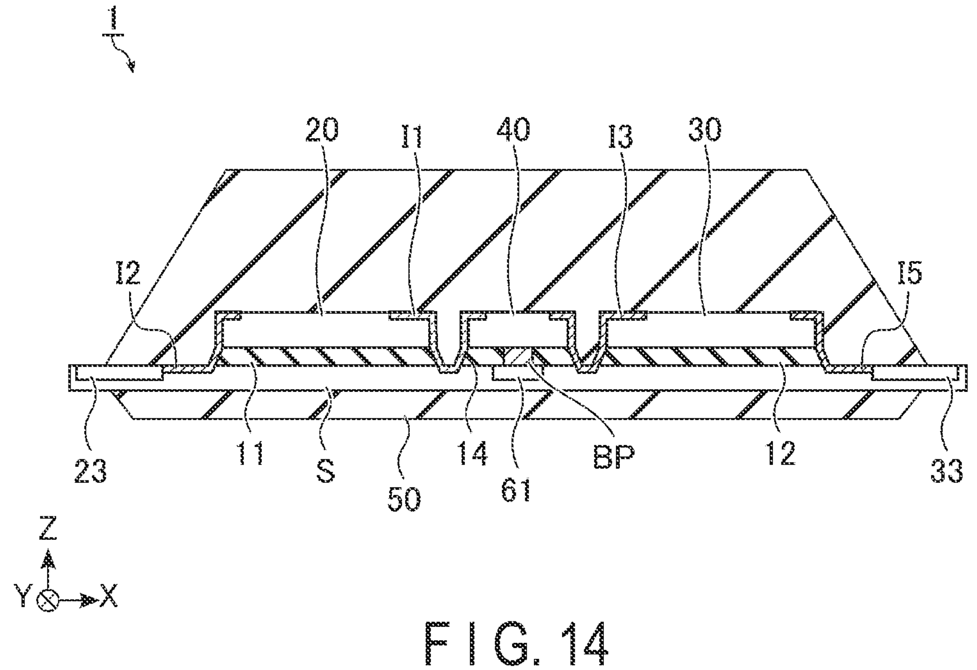
FIG. 14 is a cross-sectional view showing an exemplary cross-sectional structure of the isolator package according to the fourth modification example, taken along line XIV-XIV in FIG. 13.

The configuration of the isolator package 1 will be described with reference to FIGS. 13 and 14. FIG. 13 is a plan view showing an exemplary planar layout of the isolator package according to the fourth modification example, while FIG. 14 is a cross-sectional view showing a cross-sectional structure of the isolator package, taken along line XIV-XIV of FIG. 13.

The isolator package 1 includes interconnects I1 to 16 in place of the bonding wires W1 to W6. The interconnects I1 to 16 are molded interconnects prepared as a wiring pattern on the surfaces of the semiconductor substrate S, semiconductor chips 20 and 30, and isolator module 40. The interconnects I1 to 16 may be provided integrally with the semiconductor substrate S, semiconductor chips 20 and 30, and isolator module 40. The interconnects I1 to 16 may be formed by plating, and are sealed by the insulating member 50, as are the bonding wires W1 to W6.

The interconnect I1 may be deposited on the surfaces of the isolator module 40, semiconductor substrate S, and semiconductor chip 20. The interconnect I1 has one end electrically connected to the semiconductor chip 20 and the other end electrically connected to the isolator module 40. The interconnect I1 thereby electrically connects the circuit 21 of the semiconductor chip 20 to the isolator module 40.

The interconnect 12 may be deposited on the surfaces of the semiconductor substrate S and semiconductor chip 20. The interconnect 12 has one end electrically connected to the semiconductor chip 20 and the other end electrically connected to the pin 23. The interconnect I1 thereby electrically connects the circuit 21 of the semiconductor chip 20 to the pin 23.

The interconnect 13 may be deposited on the surfaces of the isolator module 40, semiconductor substrate S, and semiconductor chip 30. The interconnect 13 has one end electrically connected to the semiconductor chip 30 and the other end electrically connected to the isolator module 40. The interconnect 13 thereby electrically connects the circuit 31 of the semiconductor chip 30 to the isolator module 40.

The interconnect 14 may be deposited on the surfaces of the semiconductor substrate S and semiconductor chip 30. The interconnect 14 has one end electrically connected to the semiconductor chip 30 and the other end electrically connected to the wire 62. The interconnect 14 thereby electrically connects the wire 62 to the circuit 31 of the semiconductor chip 30.

The interconnect 16 may be deposited on the surfaces of the semiconductor substrate S and semiconductor chip 20. The interconnect 16 has one end electrically connected to the semiconductor chip 20 and the other end electrically connected to the wire 61. The interconnect 16 thereby electrically connects the wire 61 to the circuit 21 of the semiconductor chip 20.

The interconnect 15 may be deposited on the surfaces of the semiconductor substrate S and semiconductor chip 30. The interconnect 15 has one end electrically connected to the semiconductor chip 30 and the other end electrically connected to the pin 33. The interconnect 15 thereby electrically connects the circuit 31 of the semiconductor chip 30 to the pin 33.

Figure 15:
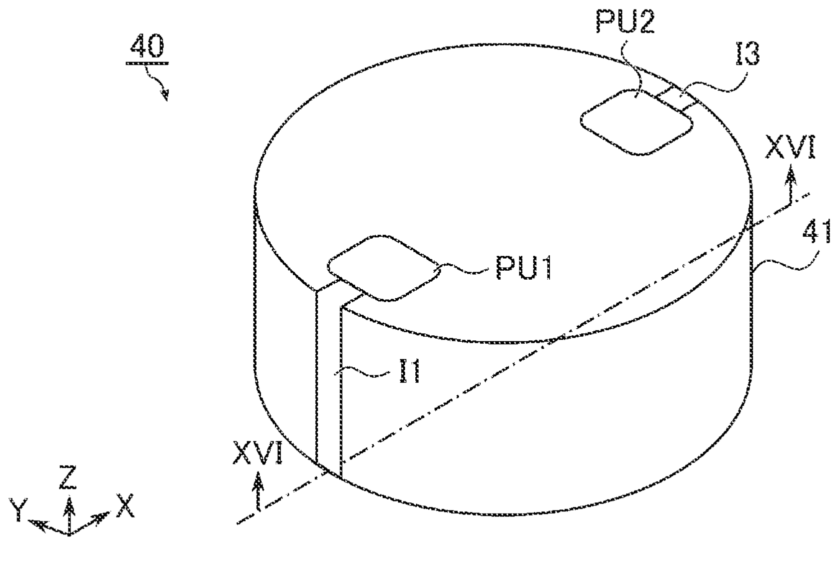
FIG. 15 is a perspective view showing an exemplary structure of an isolator module according to the fourth modification example.
Figure 16:
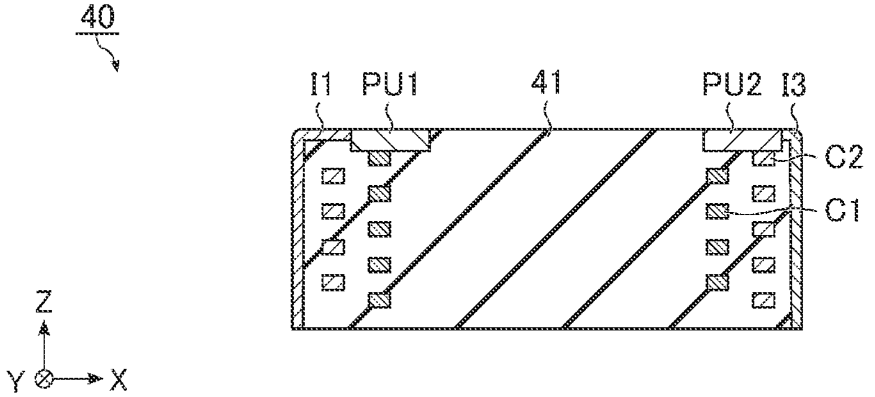
FIG. 16 is a cross-sectional view showing an exemplary cross-sectional structure of the isolator module and wirings according to the fourth modification example, taken along line XVI-XVI in FIG. 15.

The configuration of the isolator module 40 will be described with reference to FIGS. 15 and 16. FIG. 15 is a perspective view showing an exemplary structure of the isolator module according to the fourth modification example, and FIG. 16 is a cross-sectional view showing an exemplary cross-sectional structure of the isolator module and interconnects, taken along line XVI-XVI in FIG. 15.

The interconnect I1 is electrically connected to the pad PU1. The interconnect I1 is deposited on the top surface and side surface of the insulator 41 of the isolator module 40.

The interconnect 12 is electrically connected to the pad PU2. The interconnect 12 is deposited on the top surface and side surface of the insulator 41 of the isolator module 40.

The above configuration produces effects similar to the ones in the embodiment and first to third modification examples.

According to the fourth modification example, the isolator module 40 is coupled to each of the semiconductor chips 20 and 30 by molded interconnects. The semiconductor chips 20 and 30 are also coupled to the pins 23 and 33, respectively, with molded interconnects. With such a configuration, the degree of freedom in wiring can be enhanced, in comparison with the structure in which the isolator module 40, semiconductor chips 20 and 30, and pins 23 and 33 are coupled by bonding wires. The length of the interconnects therefore can be reduced, and an increase in the size and area of the isolator package 1 can be suppressed.

3. Other Embodiments

Figure 17:
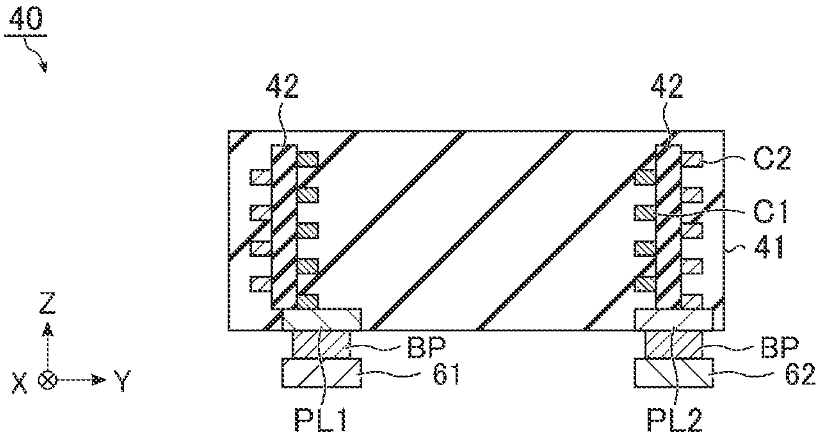
FIG. 17 is a cross-sectional view showing an exemplary cross-sectional structure of an isolator module and wirings according to another example.

According to the embodiment as well as the first to fourth modification examples, the coils C1 and C2 are arranged inside the insulator 41 formed of a single material, which is not a limitation. As illustrated in FIG. 17, an insulating member 42, which differs from the insulator 41, may be arranged between the coils C1 and C2 in the insulator 41. The insulating member 42 may include a liquid crystal polymer (LCP) resin or the like. FIG. 17 is a cross-sectional view showing an exemplary cross-sectional structure of an isolator module and wirings according to another example. FIG. 17 shows a region corresponding to the cross-sectional view of FIG. 6. With such a configuration, the dielectric strength of the isolator module 40 can be enhanced.

In addition, space may be provided inside the one of the coils C1 and C2 that has a smaller outer diameter, although it is not shown. That is, the structure is sufficient if the coils C1 and C2 are electrically insulated from each other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An isolator comprising an isolator module, the isolator module comprising:

a first coil and a second coil, each being helically shaped and having a central axis that extends in a first direction;

a first insulator configured to seal the first coil and the second coil;

a first pad coupled to a top surface of the first coil at an upper end of the first coil;

a second pad coupled to a bottom surface of the first coil at a lower end of the first coil;

a third pad coupled to a top surface of the second coil at an upper end of the second coil;

a fourth pad coupled to a bottom surface of the second coil at a lower end of the second coil;

a first chip; and a second chip, wherein the first coil and the second coil are separated from each other, the first coil is positioned inside the second coil when viewed in the first direction, the first pad and the second pad are electrically connected to the first chip, and the third pad and the fourth pad are electrically connected to the second chip.

2. The isolator of claim 1, wherein among the first pad, the second pad, the third pad, and the fourth pad, the first pad and the second pad are adjacent to each other with respect to a winding direction around the central axis that extends in the first direction, and the third pad and the fourth pad are adjacent to each other with respect to the winding direction around the central axis that extends in the first direction.

3. The isolator of claim 1, wherein among the first pad, the second pad, the third pad, and the fourth pad, the first pad is adjacent to the third pad and the fourth pad, and the second pad is adjacent to the third pad and the fourth pad, in the winding direction around the central axis that extends in the first direction.

4. The isolator of claim 1, further comprising:

a first conductor provided below the isolator module and electrically connected to the second pad and the first chip; and a second conductor provided below the isolator module and electrically connected to the fourth pad and the second chip.

5. The isolator of claim 4, wherein the isolator module is provided above the first chip, and the first conductor and the second conductor are arranged in the first chip.

6. The isolator of claim 4, further comprising:

a substrate above which the first chip and the second chip are arranged, wherein the first conductor and the second conductor are arranged on the substrate.

7. The isolator of claim 1, wherein the first chip and the first pad are electrically connected to each other by a first wiring that is arranged on a surface of the first chip and a surface of the isolator module integrally with the first chip and the isolator module, and the second chip and the third pad are electrically connected to each other by a second wiring that is arranged on a surface of the second chip and a surface of the isolator module integrally with the second chip and the isolator module.

8. The isolator of claim 7, wherein the first wiring and the second wiring are molded interconnects.

9. The isolator of claim 1, wherein a height of each of the first coil and the second coil is within a predetermined range of height.

10. The isolator of claim 1, wherein each of the first coil and the second coil has a circular, elliptical, or polygonal shape when viewed in the first direction.

11. An isolator comprising an isolator module, the isolator module comprising:

a first coil and a second coil, each being helically shaped and having a central axis that extends in a first direction;

a first insulator configured to seal the first coil and the second coil; and a second insulator arranged between the first coil and the second coil, the second insulator differing from the first insulator, wherein the first coil and the second coil are separated from each other, the first coil is positioned inside the second coil when viewed in the first direction, and the second insulator includes a liquid crystal polymer resin.

12. An isolator comprising an isolator module, the isolator module comprising:

a first coil and a second coil, each being helically shaped and having a central axis that extends in a first direction;

a first insulator configured to seal the first coil and the second coil;

wherein the first coil and the second coil are separated from each other, the first coil is positioned inside the second coil when viewed in the first direction, and the second coil has an outer diameter of approximately 5 millimeters or smaller when viewed in the first direction.

13. The isolator of claim 1, further comprising:

a third insulator sealing the isolator module, the first chip, and the second chip.

14. The isolator of claim 4, wherein the second pad and the first conductor are connected to each other by a bump or by soldering, and the fourth pad and the second conductor are connected to each other by a bump or by soldering.

15. The isolator of claim 11, wherein a height of each of the first coil and the second coil is within a predetermined range of height.

16. The isolator of claim 11, wherein each of the first coil and the second coil has a circular, elliptical, or polygonal shape when viewed in the first direction.

17. The isolator of claim 11, wherein the second coil has an outer diameter of approximately 5 millimeters or smaller when viewed in the first direction.

* * * * *